United States Patent Office.

FRANK B. SHEARER, OF COLUMBUS, OHIO.

Letters Patent No. 107,729, dated September 27, 1870.

IMPROVEMENT IN PROCESSES OF UNITING RUBBER WITH WOOD.

The Schedule referred to in these Letters Patent and making part of the same.

*To all whom it may concern:*

Be it known that I, FRANK B. SHEARER, of Columbus, in the county of Franklin and State of Ohio, have invented a certain Process of Uniting Rubber with Wood or other hard substances; and I do hereby declare that the following is a full, clear, and exact description thereof.

The nature of my invention consists in combining the compound of what, after proper treatment, forms vulcanized rubber, or any of the allied gums, with wood, metal, or other hard substances, in a mold, by means of pressure sufficient to form a perfect mechanical union of the two substances employed, and, while thus under pressure, vulcanizing the compound rubber upon the substance to which it has been united, so as to give the finished article the appearance of solid vulcanized rubber.

To carry out my process, I provide a suitable mold, having the contour it is desired to give to the article after it has been covered with or united to the rubber. This mold is made, by preference, of any kind of metal which is susceptible of a high polish, but it may be made of enameled metal, or other substance capable of withstanding the heat and pressure to which it will be subjected.

The article to be covered is placed into this mold and surrounded by the proper quantity of the compound rubber. The sections of the mold are then closed and subjected to a pressure sufficient to bring their edges together, bringing the rubber in such close contact with the substance it surrounds as to form a perfect mechanical union with the same.

While thus confined under pressure in the mold, the rubber is subjected to the proper degree of heat to effect its vulcanization.

The finished article may then be removed from the mold, possessing a highly polished surface.

What I claim, and desire to secure by Letters Patent, is—

The process herein described, of mechanically uniting compound rubber with wood, metal, or other hard substances, by means of pressure in a mold, and, while thus under pressure, vulcanizing the rubber, so as to give to the finished article the appearance of solid vulcanized rubber.

In testimony whereof I have signed my name to this specification in the presence of two subscribing witnesses.

FRANK B. SHEARER.

Witnesses:
   D. P. HOLLOWAY,
   E. M. WRIGHT.